United States Patent
Chen et al.

(10) Patent No.: US 9,017,129 B2
(45) Date of Patent: Apr. 28, 2015

(54) PRESSING DEVICE FOR ASSEMBLING LIQUID CRYSTAL DISPLAY PANEL AND ASSEMBLING METHOD THEREOF

(71) Applicant: Himax Display, Inc., Tainan (TW)

(72) Inventors: Wen-Hsu Chen, Tainan (TW); Kuan-Hsu Fan-Chiang, Tainan (TW); Hua-Hsin Wang, Tainan (TW); Yu-Wen Huang, Tainan (TW)

(73) Assignee: Himax Display, Inc., Tainan (TW)

( * ) Notice: Subject to any disclaimer, the term of this patent is extended or adjusted under 35 U.S.C. 154(b) by 125 days.

(21) Appl. No.: 14/012,675

(22) Filed: Aug. 28, 2013

(65) Prior Publication Data
US 2015/0065004 A1    Mar. 5, 2015

(51) Int. Cl.
*H01J 9/00* (2006.01)
*G02F 1/1335* (2006.01)
*C09J 153/00* (2006.01)
*G02F 1/13* (2006.01)
*B30B 15/06* (2006.01)
*G02F 1/1333* (2006.01)

(52) U.S. Cl.
CPC ............ *G02F 1/1303* (2013.01); *B30B 15/061* (2013.01); *B30B 15/064* (2013.01); *G02F 1/1333* (2013.01); *G02F 2001/133354* (2013.01)

(58) Field of Classification Search
CPC .......... H01J 9/025; H01J 9/242; H01J 9/185; H01J 2329/00; H01J 31/127; C09J 5/06; C09J 123/08; B32B 15/08; B32B 27/00; C08J 5/124; G02F 1/1341; G02F 1/133351; G02F 2001/13415; G02F 1/1339; G02F 1/1333
USPC .......................... 445/24; 156/306.6; 349/187
See application file for complete search history.

(56) References Cited

U.S. PATENT DOCUMENTS

2012/0285617 A1* 11/2012 Azami et al. ............... 156/306.6
2012/0305182 A1* 12/2012 Azami et al. ............... 156/306.6

* cited by examiner

*Primary Examiner* — Joseph L Williams
(74) *Attorney, Agent, or Firm* — J.C. Patents

(57) ABSTRACT

A pressing device for assembling a liquid crystal display panel is provided. The pressing device includes a base plate, a pressing plate, a first cushion and a second cushion. The pressing plate is disposed opposite to the base plate and adapted to move toward or away from the base plate. The first cushion is disposed between the base plate and the pressing plate. The second cushion is disposed between the pressing plate and the first cushion, wherein one of the first cushion and the second cushion has a hollow zone corresponding to a display area of the liquid crystal display panel. A method for assembling a liquid crystal display panel is further provided.

10 Claims, 3 Drawing Sheets

PRESSING DEVICE FOR ASSEMBLING LIQUID CRYSTAL DISPLAY PANEL AND ASSEMBLING METHOD THEREOF

BACKGROUND OF THE INVENTION

1. Field of the Invention

The present invention generally relates to a device for assembling a liquid crystal display (LCD) panel and an assembling method thereof. More particularly, the present invention relates to a pressing device capable of assembling a LCD panel with a uniform cell gap and an assembling method thereof.

2. Description of Related Art

Liquid crystal display panel having such advantages as high image quality, efficient space utilization, low power consumption, and no radiation, has become the mainstream in the display market.

In general, a liquid crystal display panel comprises two substrates, both of which possess a plurality of corresponding pixel electrodes, and the cell gap, the distance between the corresponding pixel electrodes, is inserted with the liquid crystal. The optical effect of the liquid crystal will vary with the width of the cell gap. An uneven cell gap between the substrates resulting in the interfering ring visible to the naked eyes is called "Newton ring" that may cause injury to the display effect of the LCD pixel.

One of the conventional methods to form the uniform cell gap between the opposing substrates of LCD panel is scattering spacer elements having predetermined dimensions on one substrate before attaching the other substrate. However, distributing the spacer elements evenly on the substrate is quite difficult. Besides, the spacer elements might land on display pixels and obstruct impinging image-forming light radiation.

SUMMARY OF THE INVENTION

Accordingly, the present invention is directed to a pressing device for assembling a liquid crystal display panel with uniform cell gap and its assembling method.

The present invention provides a pressing device for assembling a liquid crystal display panel. The pressing device includes a base plate, a pressing plate, a first cushion and a second cushion. The pressing plate is disposed opposite to the base plate and adapted to move toward or away from the base plate. The first cushion is disposed between the base plate and the pressing plate. The second cushion is disposed between the pressing plate and the first cushion, wherein one of the first cushion and the second cushion has a hollow zone corresponding to a display area of the liquid crystal display panel.

According to an embodiment of the present invention, a dimension of the hollow zone is substantially the same as that of the display area.

According to an embodiment of the present invention, a pattern of the first cushion or the second cushion having the hollow zone corresponds to that of a non-display area of the liquid crystal display panel.

According to an embodiment of the present invention, the base plate is a hot plate.

The present invention further provides a method for assembling a liquid crystal display panel, wherein the liquid crystal display panel has a display area and comprises a first substrate and a second substrate. The method comprises the following steps. Providing a pressing device, wherein the pressing device comprises a base plate, a pressing plate, a first cushion and a second cushion, the pressing plate is disposed opposite to the base plate and adapted to move toward or away from the base plate, the first cushion is disposed between the hot plate and the pressing plate, and the second cushion is disposed between the pressing plate and the first cushion, wherein one of the first cushion and the second cushion has a hollow zone. Disposing the first substrate and the second substrate between the first cushion and the second cushion, wherein the hollow zone corresponds to the display area. Imposing pressure on the first substrate and the second substrate by the pressing device.

According to an embodiment of the present invention, further comprises the step of heating the base plate.

According to an embodiment of the present invention, a dimension of the hollow zone is substantially the same as that of the display area.

According to an embodiment of the present invention, a pattern of the first cushion or the second cushion having the hollow zone corresponds to that of a non-display area of the liquid crystal display panel.

According to an embodiment of the present invention, in the step of imposing pressure, the first cushion and the second cushion respectively contact the first substrate and the second substrate, the first substrate is a silicon based substrate, the second substrate is a glass substrate, and the second cushion has the hollow zone.

According to an embodiment of the present invention, in the step of imposing pressure, the first cushion and the second cushion respectively contact the first substrate and the second substrate, the first substrate is a glass substrate, the second substrate is a silicon based substrate, and the first cushion has the hollow zone.

By employing the pressing device and the method of the present invention, the LCD panel is able to generate a uniform cell gap so that the image quality can be enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
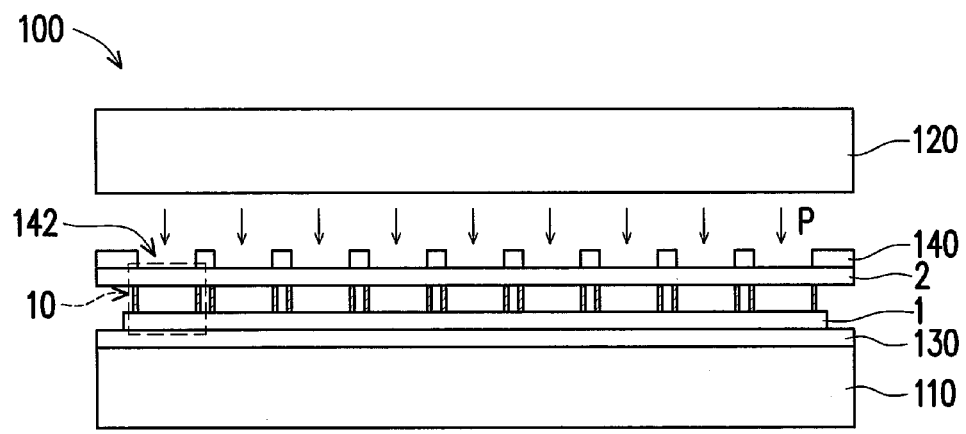
FIG. 1A is a schematic cross-sectional view of a cell forming process of at least one LCD panel in utilization of a pressing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
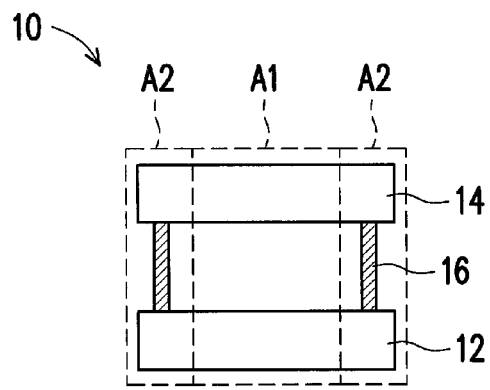
FIG. 1B is a schematic cross-sectional view of the LCD panel.

FIG. 1A is a schematic cross-sectional view of a cell forming process of at least one LCD panel in utilization of a pressing device according to an embodiment of the invention. FIG. 1B is a schematic cross-sectional view of the LCD panel. Referring to FIG. 1A and FIG. 1B, a pressing device 100 of the embodiment is capable of assembling a plurality liquid crystal display (LCD) panels 10. Each LCD panel 10 has a display area A1 and a non-display area A2 outside the display area A1, and each LCD panel 10 comprises a first substrate 12, a second substrate 14 and a sealant 16 sealed between the first substrate 12 and the second substrate 14. Liquid crystals (not shown) are filled in a space enclosed by the first substrate 12, the second substrate 14 and the sealant 16. In the embodiment, a first substrate 12 is a silicon based substrate such as silicon chip, a second substrate 14 is a glass substrate, the LCD panel 10 is a liquid crystal on silicon (LCOS) panel, but the type of the LCD panel 10 is not limited thereto.

The pressing device 100 includes a base plate 110, a pressing plate 120, a first cushion 130 and a second cushion 140. In the embodiment, the base plate 110 is a hot plate. That is, the pressing device 100 is a hot pressing device, but in another embodiment, the pressing device 100 also can be a vacuum pressing device or a pressing device with UV-irradiation, the type of the pressing device 100 is not limited thereto. The pressing plate 120 is disposed opposite to the base plate 110 and adapted to move toward or away from the base plate 110. The first cushion 130 is disposed between the base plate 110 and the pressing plate 120. The second cushion 140 is disposed between the pressing plate 120 and the first cushion 130. A space between the first cushion 130 and the second cushion 140 is adapted for accommodating a silicon wafer 1 comprising the plural of the first substrates 12 (i.e. the silicon chips) and a glass substrate 2 comprising the plural of second substrates 14 so as to proceed a cell forming process. In the embodiment, the first cushion 130 is a uniform cushion, that is, the whole first cushion 130 has a substantially same thickness.

Figure 2:
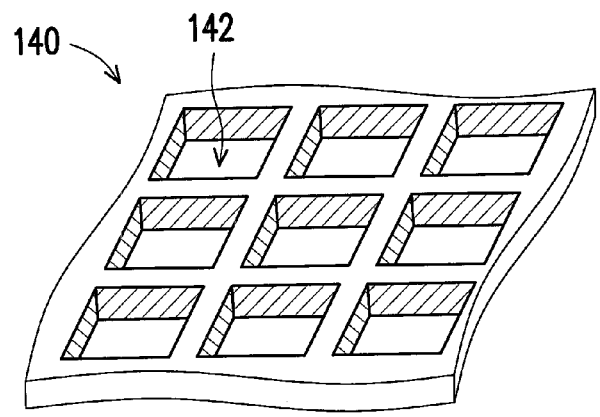
FIG. 2 is a partial diagram of a second cushion of the pressing device of FIG. 1A.
Figure 3:
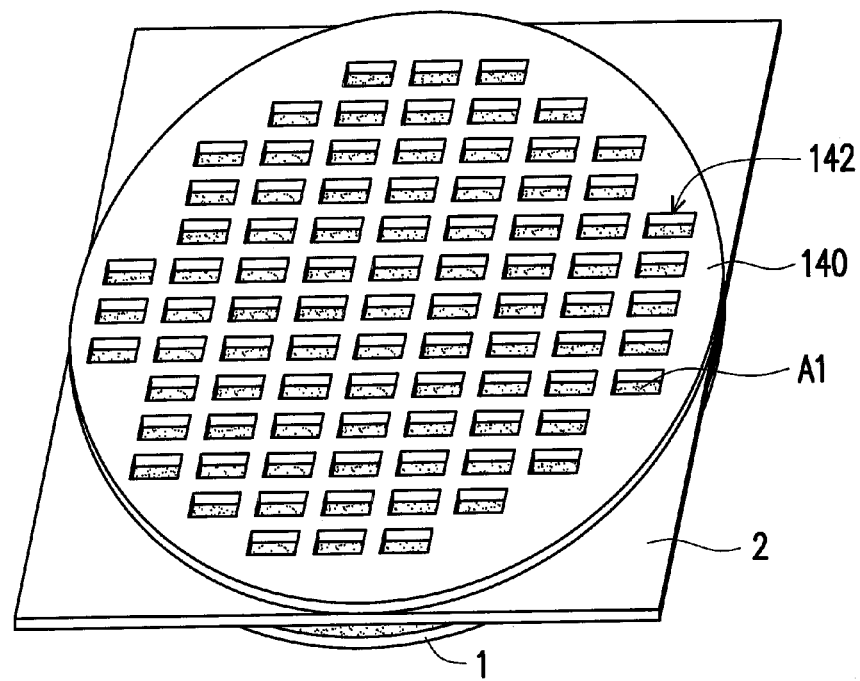
FIG. 3 is a schematic diagram of the second cushion disposed on the silicon wafer and the glass substrate.

FIG. 2 is a partial diagram of a second cushion of the pressing device of FIG. 1A. As shown in FIG. 1A and FIG. 2, the second cushion 140 has a plurality of hollow zones 142. FIG. 3 is a schematic diagram of the second cushion disposed on the silicon wafer and the glass substrate. Referring to FIG. 3, in the embodiment, the glass substrate 2 comprising the plural of second substrates 14 is disposed on the silicon wafer 1 comprising the plural of the first substrates 12, and the silicon wafer 1 and the glass substrate 2 are sealed by the sealants (not shown). The second cushion 140 is disposed on the glass substrate 2. As shown in FIG. 3, the relative positions of hollow zones 142 in the second cushion 140 correspond to the display areas A1 of the LCD panels 10, and a dimension of each hollow zone 142 is substantially the same as that of the display area A1. A pattern of the second cushion 140 corresponds to that of the non-display areas A2 of the LCD panels 10.

Please back to FIG. 1A, when processing a cell forming process, the silicon wafer 1 and the glass substrate 2 are disposed between the first cushion 130 and the second cushion 140. In detail, the silicon wafer 1 having the plural of first substrates 12 contacts the first cushion 130, and the glass substrate 2 having the plural of second substrates 14 contacts the second cushion 140. The hollow zones 142 of the second cushion 140 correspond to the display areas A1 of the LCD panels 10, while the other portions correspond to the non-display area A2 of the LCD panels 10.

Then, the base plate 110 is heated, and the pressing plate 120 moves downwardly to exert pressure P on the silicon wafer 1 and the glass substrate 2. The heat energy generating from the heat plate 110 is transmitted to the LCD panels 10 to make the sealants 16 cure. The first substrate 12 and the second substrate 14 of each LCD panels 10 are thus assembled.

In the embodiment, the first cushion 130 and the second cushion 140 are made of soft material such as polytetra fluoroethylene (PTFE) so as to evenly distribute the heat energy and the pressure in avoiding the occurrence of partial overheating or overstress during the cell forming process. In addition, the second cushion 140 having the hollow zones 142 has high gas permeability. Because the pressing plate 120 presses the second cushion 140 tightly during the cell forming process, a plurality of chambers are temporarily formed between the pressing plate 120 and the second cushion 140. While the temperature within the chambers is getting higher, the pressure is increasing. Due to the high gas permeability of the second cushion 140, air in the chambers is capable of flowing to the outside so as to keep a local pressure in each chamber as the outer atmosphere. But the material of the first cushion 130 and the second cushion 140 are not limited thereto.

The pressing device 100 of the embodiment lies in forming a regular cell gap by utilizing a second cushion 140 having a plurality of hollow zones 142 correspond to the display areas A1 and the other portions correspond to the non-display areas A2 to carry out the cell forming process. The assembling method by utilization of the pressing device 100 is simple as compared to the conventional method, since it does not require applying any spacer between the first substrate 12 and the second substrate 14. Moreover, the manufacturing cost will not increase as the cell forming process.

In addition, the experiment proved that the average uniformity of the cell gap between the glass substrate 1 and the silicon wafer 2 is about 85.5%, and the average uniformity of the cell gap between the first substrate 12 and the second substrate 14 (i.e. the silicon chip) is about 87.8%. In other words, the cell gap of the LCD panel 10 assembled by the pressing device 100 of the embodiment has good uniformity.

Figure 4:
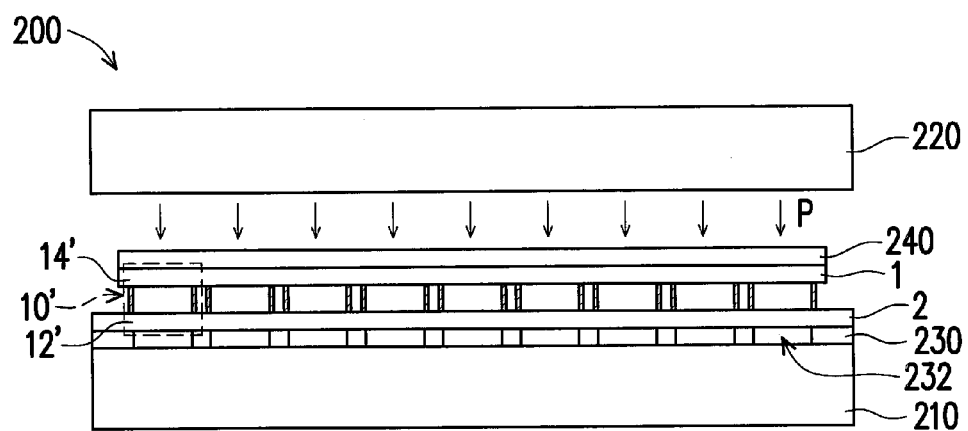
FIG. 4 is a schematic cross-sectional view of a cell forming process of a LCD panel in utilization of a pressing device according to another embodiment of the invention.

FIG. 4 is a schematic cross-sectional view of a cell forming process of a LCD panel in utilization of a pressing device according to another embodiment of the invention. Referring to FIG. 4, a difference between this embodiment and the above embodiment is that, in the embodiment, during the cell forming process, a glass substrate 2 contacts a first cushion 230, and a silicon wafer 1 contacts a second cushion 240. That is, in the embodiment, a first substrate 12' of a LCD panel 10' is the glass substrate, and a second substrate 14' of the LCD panel 10' is the silicon chip. Besides, in the embodiment, the first cushion 230 which contacts a base plate 210 has the hollow zones 232, and the second cushion 240 which contacts a pressing plate 220 in the cell forming process is a uniform cushion, in other words, the whole second cushion 240 has a substantially same thickness.

In the above embodiment, heat energy generating from the base plate 110 is transmitted to the silicon wafer 1 first, and then to the glass substrate 2. As shown in FIG. 3, because the dimension of the silicon wafer 1 is smaller than that of the glass substrate 2, it is difficult to uniformly transmit heat energy generating from the base plate 110 to the glass substrate 2 during the cell forming process. Therefore, a part of heat is dissipating from periphery of the silicon wafer 1. On the contrary, in this embodiment, the glass substrate 2 which has larger dimension is placed on the first cushion 230, the glass substrate 2 is capable of transmitting more heat energy to the silicon wafer 1. Therefore, in the embodiment, the glass substrate 2 and the silicon wafer 1 have better thermal uniformity during the cell forming process.

The experiment proved that the average uniformity of the cell gap between the glass substrate 2 and the silicon wafer 1 is about 93.8%, and the average uniformity of the cell gap between the first substrate 12' (i.e. the glass substrate) and the second substrate 14' (i.e. the silicon chip) is about 98.2%.

Therefore, the cell gap of the LCD panel 10' assembled by the pressing device 200 of the embodiment has better uniformity.

Moreover, the above explanation of the embodiments is focused the production process of the LCOS panel, but the pressing device according to this invention and the aforesaid cell process are capable of finding application in all manufacturing process of LCD panel.

In sum, the pressing device and the assembling method is able to assemble a LCD panel with a regular cell gap so as to enhance the image quality and prevent a Newton ring. Furthermore, a uniform cell gap can be obtained by utilizing the conventional manufacturing device, e.g. the hot pressing device, the vacuum pressing device and the pressing device with UV-irradiation, together with the first cushion or the second cushion having the hollow zone corresponds to a display area of the LCD panel and the other portion corresponds to a non-display area of the LCD panel to carry out the cell forming process without increasing manufacturing cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pressing device for assembling a liquid crystal display panel, comprising:
    a base plate;
    a pressing plate, disposed opposite to the base plate and adapted to move toward or away from the base plate;
    a first cushion, disposed between the base plate and the pressing plate; and
    a second cushion, disposed between the pressing plate and the first cushion, wherein one of the first cushion and the second cushion has a hollow zone corresponding to a display area of the liquid crystal display panel.

2. The pressing device as claimed in claim 1, wherein a dimension of the hollow zone is substantially the same as that of the display area.

3. The pressing device as claimed in claim 1, wherein a pattern of the first cushion or the second cushion having the hollow zone corresponds to that of a non-display area of the liquid crystal display panel.

4. The pressing device 1 as claimed in claim 1, wherein the base plate is a hot plate.

5. A method for assembling a liquid crystal display panel, wherein the liquid crystal display panel has a display area and comprises a first substrate and a second substrate, the method comprising:
    providing a pressing device, wherein the pressing device comprises a base plate, a pressing plate, a first cushion and a second cushion, the pressing plate is disposed opposite to the base plate and adapted to move toward or away from the base plate, the first cushion is disposed between the hot plate and the pressing plate, and the second cushion is disposed between the pressing plate and the first cushion, wherein one of the first cushion and the second cushion has a hollow zone;
    disposing the first substrate and the second substrate between the first cushion and the second cushion, wherein the hollow zone corresponds to the display area; and
    imposing pressure on the first substrate and the second substrate by the pressing device.

6. The method as claimed in claim 5, further comprising: heating the base plate.

7. The method as claimed in claim 5, wherein a dimension of the hollow zone is substantially the same as that of the display area.

8. The method as claimed in claim 5, wherein a pattern of the first cushion or the second cushion having the hollow zone corresponds to that of a non-display area of the liquid crystal display panel.

9. The method as claimed in claim 5, wherein in the step of imposing pressure, the first cushion and the second cushion respectively contact the first substrate and the second substrate, the first substrate is a silicon based substrate, the second substrate is a glass substrate, and the second cushion has the hollow zone.

10. The method as claimed in claim 5, wherein in the step of imposing pressure, the first cushion and the second cushion respectively contact the first substrate and the second substrate, the first substrate is a glass substrate, the second substrate is a silicon based substrate, and the first cushion has the hollow zone.

* * * * *